3,489,759
CERTAIN SALTS OF [1-AZONIA-2-(1,3-DIOXOLAN-2-YL)BENZYL]DIESTERS AND DERIVATIVES THEREOF

Donald L. Fields and Jerry B. Miller, Rochester, N.Y., assignors to Eastman Kodak Company, Rochester, N.Y., a corporation of New Jersey
No Drawing. Original application May 20, 1964, Ser. No. 368,979, now Patent No. 3,375,253, dated Mar. 26, 1968. Divided and this application Aug. 22, 1967, Ser. No. 671,183
Int. Cl. C07d *31/34, 39/00;* C07c *69/76*
U.S. Cl. 260—295                 8 Claims This application is a division of copending U.S. patent application Ser. No. 368,979, filed May 20, 1964, now Patent No. 3,375,253.

This invention relates to novel salts of [1-azonia-2-(1,3-dioxolan-2-yl)benzyl]aromatic diesters and their preparation and to novel diol, diester and dione azonia salts derived from the salts of [1-azonia-2-(1,3-dioxolan-2-yl)benzyl]aromatic diesters and the preparation of the azonia salts.

The novel salts of [1-azonia-2-(1,3-dioxolan-2-yl)benzyl]aromatic diesters of our invention have cations of the formula:

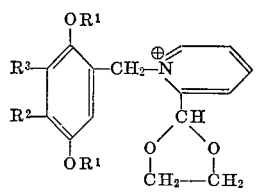

or the formula:

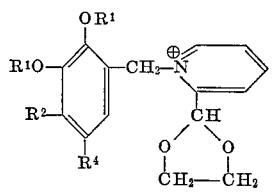

in which $R^1$ is lower acyl; $R^2$ and $R^3$ can be hydrogen, alkyl, aryl or 1-azonia-2-(1,3-dioxolan-2-yl)benzyl; $R^4$ can be hydrogen, alkyl or aryl; no more than one of the substituents $R^2$ and $R^3$ can be 1-azonia-2-(1,3-dioxolan-2-yl)benzyl and one of the substituents $R^2$, $R^3$ and $R^4$ is hydrogen when $R^2$ or $R^3$ is 1-azonia-2-(1,3-dioxolan-2-yl)benzyl.

The substituent $R^1$ is the preceding formulae is lower acyl, e.g., acyl of 1 to about 4 carbon atoms such as formyl, acetyl, propionyl, butyryl, isobutyryl, etc. and is preferably acetyl. $R^2$, $R^3$ and $R^4$ when alkyl, are typically straight or branched-chain alkyl of 1 to about 8 carbon atoms and are preferably lower alkyl, e.g. alkyl of 1 to about 4 carbon atoms such as methyl, ethyl, propyl, isopropyl, butyl, sec-butyl, tert-butyl, etc. When $R^2$, $R^3$ and $R^4$ are aryl, they are preferably mononuclear carbocyclic aryl, e.g., phenyl, tolyl, xylyl, etc. $R^2$ and $R^3$, when 1-azonia-2-(1,3-dioxolan-2-yl)benzyl, have the formula:

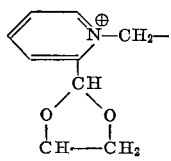

The novel salts of [1-azonia-2-(1,3-dioxolan-2-yl)benzyl]-aromatic diesters of our invention are thus 1-azonia-2-(1,3-dioxolan-2-yl)benzyl derivatives of hydroquinone and catechol diesters. Examples of some of the novel compounds within the scope of our invention are 2-[azonia-2-(1,3-dioxolan-2-yl)benzyl]hydroquinone diacetate bromide;
2-[1-azonia-2-(1,3-dioxolan-2-yl)benzyl]5-methyl hydroquinone dibutyrate bromide;
2-[1-azonia-2-(1,3-dioxolan-2-yl)benzyl]-6-methyl hydroquinone dibutyrate bromide;
2-[1-azonia-2-(1,3-dioxolan-2-yl)benzyl]-6-phenyl hydroquinone dipropionate bromide;
2-[1-azonia-2-(1,3-dioxolan-2-yl)benzyl]-5-phenyl hydroquinone dipropionate bromide;
2,5-bis[1-azonia-2-(1,3-dioxolan-2-yl)benzyl] hydroquinone diisobutyrate dibromide;
2,6-bis[1-azonia-2-(1,3-dioxolan-2-yl)benzyl] hydroquinone diacetate dibromide;
3-[1-azonia-2-(1,3-dioxolan-2-yl)benzyl]catechol dipropionate bromide;
3-[1-azonia-2-(1,3-dioxolan-2-yl)benzyl]-5-phenylcatechol diacetate bromide;
3-[1-azonia-2-(1,3-dioxolan-2-yl)benzyl]-6-methylcatechol diacetate bromide;
3-[1-azonia-2-(1,3-dioxolan-2-yl)benzyl]-5-methylcatechol diacetate bromide;
3-[1-azonia-2-(1,3-dioxolan-2-yl)benzyl]-6-phenylcatechol diacetate bromide;
3,6-bis[1-azonia-2-(1,3-dioxolan-2-yl)benzyl]catechol diacetate dibromide; etc.

The bromides of the novel compounds of our invention are prepared by contacting 2-(1,3-dioxolan-2-yl)-pyridine with a bromomethyl aromatic diester in the presence of a quaternizing solvent. The bromomethyl aromatic diesters which are useful in the process of our invention are lower alkanoic acid diesters of hydroquinone of the formula:

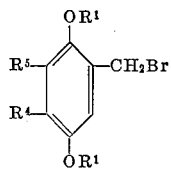

or lower alkanoic acid diesters of catechol of the formula:

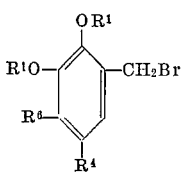

in which $R^1$ and $R^4$ are as defined hereinbefore, $R^5$ and $R^6$ can be hydrogen, alkyl, aryl or bromomethyl; no more than one of the substituents $R^5$ and $R^6$ can be bromomethyl and one of the substituents $R^4$, $R^5$ and $R^6$ is hydrogen when $R^5$ or $R^6$ is bromomethyl.

The bromomethylhydroquinone diesters and bromomethyl catechol diesters which are useful in the process of our invention can be prepared by the method disclosed by Fields and Reynolds in U.S. patent application Ser. No. 335,350, filed Jan. 2, 1964.

The process of our invention can thus be represented by the equations:

(I)

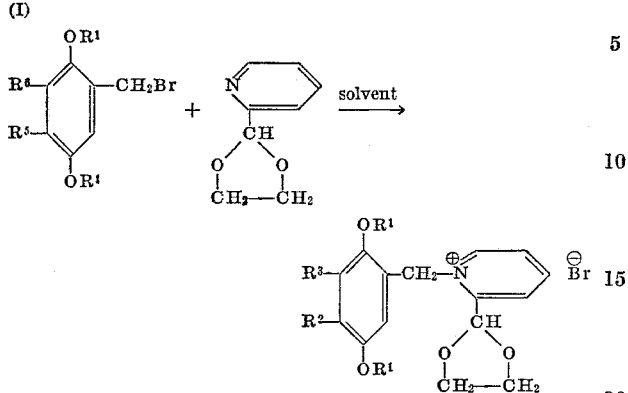

(II)

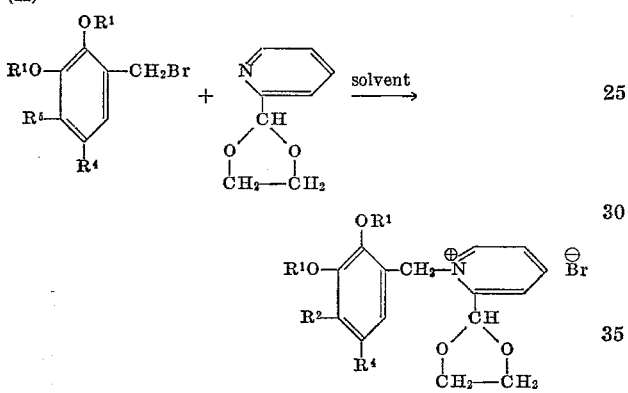

in which $R^1$, $R^2$, $R^3$, $R^4$, $R^5$ and $R^6$ are as defined hereinbefore.

The contacting of the bromomethyl aromatic diester and 2-(1,3-dioxolan-2-yl)pyridine should be carried out at a temperature of about 15° C. to about 150° C. The time required for the reaction depends, in general, upon the reaction temperature; higher temperatures requiring shorter reaction times and lower temperatures requiring longer reaction times. Preferred reaction temperatures are about 80° C. to about 105° C. Reaction times of 2 to about 24 hours are generally satisfactory at temperatures of 80 to 105° C.

For ease of temperature control, the reaction is preferably carried out by heating the solution of the reactants in the quaternizing solvent under reflux. The preferred quaternizing solvents are those whose atmospheric pressure boiling points are within the range of 80 to 105° C. Examples of the preferred quaternizing solvents include benzene, acetonitrile, nitromethane, etc. The useful quaternizing solvents are those polar solvents which promote the quaternization reaction, in which the reactants are soluble and which are relatively inert to the reactants. Examples of other quaternizing solvents include nitrobenzene, dimethyl formamide, tetramethylene sulfone, etc.

The salts of [1 - azonia-2-(1,3-dioxolan-2-yl)benzyl] aromatic diesters can be separated from the quaternizing solvent by precipitation, e.g., by cooling the solution or by adding a precipitating agent such as ether in which the bromide is insoluble. A stoichiometric excess of either the bromomethyl aromatic diester or 2 - (1,3-dioxolan-2-yl) pyridine can be employed. However, it is preferred to employ a stoichiometric excess of the 2-(1,3-dioxolan-2-yl)pyridine. The reaction can be conducted at subatmospheric or superatmospheric pressures. However, atmosphere pressure is preferred for reasons of convenience.

The following examples illustrate novel compounds of our invention and their preparation.

EXAMPLE 1

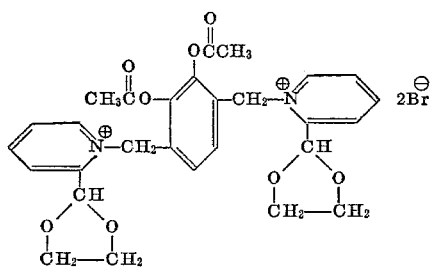

3,6-bis[1-azonia-2-(1,3-dioxolan-2-yl)benzyl]-catechol diacetate dibromide

A mixture of 399 g. (1.05 M) of 3,6-bis(bromomethyl) catechol diacetate and 400 g. of 2-(1,3-dioxalan-2-yl)pyridine in 750 ml. of acetonitrile was heated under reflux for four hours. The bis quaternary salt slowly separated as white needles as the viscous reaction mixture cooled to room temperature. Dilution of the reaction mixture with 2 liters of ether caused the precipitation of the remainder of the bis quaternary salt as a semi-crystalline mass. The product bis quaternary salt was dissolved in warm ethanol. The bis quaternary salt was recrystallized by diluting the ethanol solution with one liter of acetone and then adding ethylacetate to the point of incipient opalescence. The product slowly crystallized as a monohydrate over a 12-hour period at 5° C. M.P. 145–146° C.

Analysis.—Calcd. for $C_{28}H_{32}N_2O_9Br_2$: C, 48.1; H, 4.3. Found: C, 48.5; H, 4.5.

EXAMPLE 2

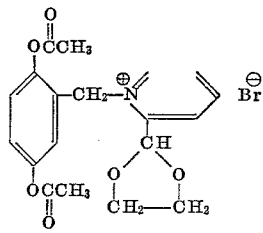

2-[1-azonia-2-(1,3-dioxolan-2-yl)benzyl]-hydroquinone diacetate bromide

A mixture of 46 gm. of 2-bromomethyl hydroquinone diacetate and 40 gm. of 2-(1,3-dioxolan-2-yl)pyridine in 100 ml. of acetonitrile was heated under reflux for 1 hour. The mixture was concentrated to a viscous sirup which crystallized after trituration with a small amount of ether.

The product was recrystallized from ethanol-ether as white needles. M.P. 155–157° C.

Analysis.—Calcd. for $C_{19}H_{20}BrNO_6$: C, 52.0; H, 4.6; N, 3.2. Found: C, 51.9; H, 4.8; N, 3.2.

EXAMPLE 3

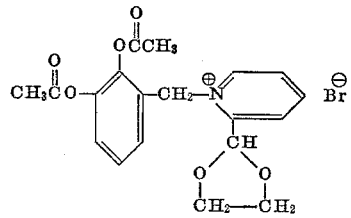

3-[1 - azonia - 2-(1,3-dioxolan-2-yl)benzyl]catechol diacetate bromide was prepared by heating under reflux a mixture of 3-bromomethyl catechol diacetate and 2-(1,3-dioxolan - 2-yl)pyridine in acetonitrile according to the method of Example 1.

The product was recovered as white needles. M.P. 150–152° C.

*Analysis.*—Calcd. for $C_{19}H_{20}BrNO_6$: C, 52.0; H, 4.6; N, 3.2. Found: C, 52.3; H, 4.3; N, 3.2.

EXAMPLE 4

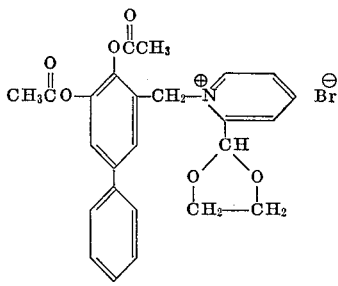

3 - [1 - azonia-2-(1,3-dioxolan-2-yl)benzyl]-5-phenyl catechol diacetate bromide was prepared as white needles by refluxing 84 gm. of 3-bromomethyl-5-phenyl catechol diacetate with 38 gm. of 2-(1,3-dioxolan-2-yl)pyridine in 400 ml. acetonitrile according to the method of Example 1.

EXAMPLE 5

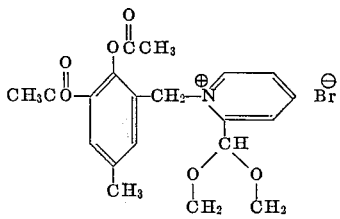

3 - [1 - azonia - 2-(1,3-dioxolan-2-yl(benzyl]-5-methyl catechol diacetate bromide was prepared as a clear sirup by refluxing 3-bromomethyl-5-methyl catechol diacetate with 2-(1,3-dioxolan-2-yl)-pyridine in acetonitrile according to the method of Example 1.

The novel salts of [1-azonia-2-(1,3-dioxolan-2-yl)benzyl]-aromatic diesters of our invention are useful for the preparation of novel azoniaanthracene, diazoniapentacene and diazoniapentaphene salts by aromatic cyclodehydration and, when used for such purpose, exhibit an unexpectedly rapid reaction rate when subjected to the action of the cyclodehydrating agent.

The novel azoniaanthracenes produced directly from salts of [1-azonia-2-(1,3-dioxolan-2-yl)benzyl]aromatic diesters of our invention are hydroquinone derivatives of the formula:

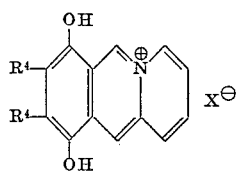

and catechol derivatives of the formula:

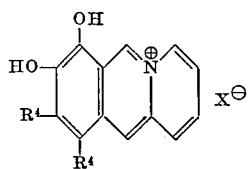

the novel diazoniapentaphenes produces directly from salts of [1-azonia-2-(1,3-dioxolan-2-yl)benzyl]aromatic diesters of our invention have the formula:

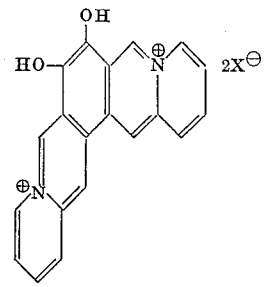

and the novel diazoniapentacenes produced directly from salts of [1-azonia-2-(1,3-dioxolan-2-yl)benzyl]aromatic diesters of our invention have the formula:

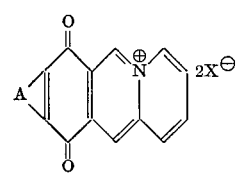

wherein $R^4$ is as hereinbefore defined; $X^\ominus$ is the anion of the cyclodehydrating agent and A is the heterocyclic residue of the formula:

Examples of novel azonia diols within the scope of our invention includes salts having cations such as 5,6-dihydroxy-4a-azoniaanthracene; 5,8-dihydroxy-4a-azoniaanthracene; 5,6-dihydroxy-8-methyl-4a-azoniaanthracene; 5,6 - dihydroxy-8-phenyl-4a-azoniaanthracene; 6,7 - dihydroxy-4a,8a-diazoniapentaphene; etc.

Examples of novel diones of our invention produced directly from the 2-[1-azonia-2-(1,3-dioxolan-2-yl)benzyl]-hydroquinone salts include salts having the cations 4a,11a-diazoniapentacene - 6,13 - dione and 4a,7a - diazoniapentacene-6,13-dione.

The preceding azoniaanthracene, diazoniapentacene and diazoniapentaphene salts are produced by subjecting the appropriate salts of [1-azonia-2-(1,3-dioxolan-2-yl)benzyl]aromatic diesters to the action of a cyclodehydrating agent. Preferred cyclodehydrating agents are the strong, non-oxidizing mineral acids, particularly acids such as hydrobromic acid, hydrochloric acid, polyphosphoric acid, etc. Other useful cyclodehydrating agents are hydrogen fluoride, sulfuric acid, etc. The cyclodehydrating agent is preferably employed in an aqueous solution or in a lower alkanoic acid solution.

The cyclodehydration can be carried out at a temperature of about 15° C. up to the temperature of thermal decomposition of the azonia salt being prepared. Preferred cyclodehydration temperatures are from about 75° C. to about 125° C. Because of the unexpected reactivity of the salts of [1 - azonia-2-(1,3 - dioxolan-2-yl)benzyl]aromatic diesters the time required for the cyclodehydration reaction is unexpectedly short and is less than one hour with most cyclodehydrating agents.

A convenient method for effecting the cyclodehydration reaction is to contact the salt of [1-azonia-2-(1,3-dioxolan-2-yl)-benzyl]aromatic diesters with a solution of a cyclodehydrating agent in water or a lower alkanoic acid at a temperature of about 75° C. to about 125° C. Although superatmospheric or subatmospheric pressures can be used, it is preferred for reasons of convenience, to conduct the cyclodehydration reaction at atmospheric pressure.

The resulting azoniaanthracene, diazoniapentacene or diazoniapentaphene salt can be separated by precipitation from the cyclodehydration solution, e.g., by evaporation or by adding a precipitating agent, e.g., ether, to the solution.

The following examples illustrate the cyclodehydration of the salts of [1-azonia-2-(1,3-dioxolan-2-yl)benzyl] aromatic diesters of our invention and novel salts produced thereby.

EXAMPLE 6

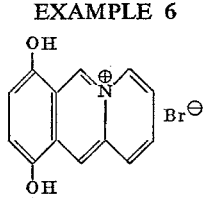

5,8-dihydroxy-4a-azoniaanthracene bromide

A mixture of 136.4 g. of 2-[1-azonia-2-(1,3-dioxolan-2-yl)-benzyl]hydroquinone diacetate and 600 ml. of 32% hydrogen bromide in acetic acid was heated under reflux. After solids began separating, 250 ml. of acetic acid was added. The mixture was refluxed for 30 minutes. After 600 ml. acetic anhydride was added, the solution was stripped to yield a bright red paste. The red paste was washed with two 100 ml. portions of acetic acid and then with ether to give a 90% yield of 5,8-dihydroxy-4a-azoniaanthracene bromide.

A sample of the crude product was recrystallized from hydrobromic acid. The product melted with decomposition at 326° C.

*Analysis.*—Calcd. for $C_{13}H_{10}BrNO_2$: C, 53.4; H, 3.4; Br, 27.4; N, 4.8. Found: C, 53.7; H, 3.5; Br, 27.7; N, 4.6.

EXAMPLE 7

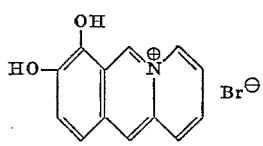

5,6-dihydroxy-4a-azoniaanthracene bromide

A solution of 10 g. of 3-[1-azonia-2-(1,3-dioxolan-2-yl)-benzyl]catechol diacetate in 50 ml. of 32% hydrogen bromide in acetic acid was heated under reflux for 45 minutes. The mixture was diluted with ether and filtered to give the crude product. Recrystallization from hydrobromic acid gave pure 5,6-dihydroxy-4a-azoniaanthracene bromide.

*Analysis.*—Calcd. for $C_{13}H_{10}BrNO_2$: C, 53.4; H, 3.4; N, 4.8. Found: C, 53.6; H, 3.8; N, 4.6.

EXAMPLE 8

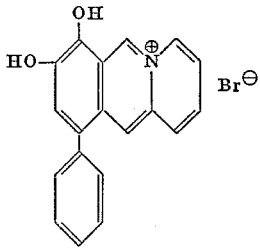

5,6-dihydroxy-8-phenyl-4a-azoniaanthracene bromide

A mixture of 27 g. of 3-[1-azonia-2-(1,3-dioxolan-2-yl)-benzyl]-5-phenylcatechol diacetate bromide and 175 ml. of 32% hydrogen bromide in acetic acid was heated under reflux for 45 minutes. Fifty ml. of acetic anhydride was added and the mixture was stripped to a dark red sirup. Trituration with ether gave a hygroscopic powder. The powder was boiled for 5 minutes with 48% hydrobromic acid to yield the crude product. Recrystallization from aqueous ethanol gave an analytical sample of 5,6-dihydroxy - 8 - phenyl - 4a - azoniaanthracene bromide hemihydrate.

*Analysis.*—Calcd. for $C_{19}H_{14}BrNO_2 \cdot 1/2\ H_2O$: C, 60.5; H, 4.0; Br. 21.2; N, 3.7. Found: C, 60.2; H, 4.0; Br. 21.7; N, 3.6.

EXAMPLE 9

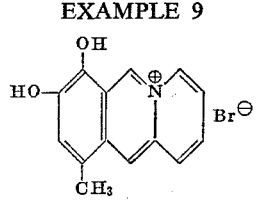

5,6-dihydroxy-8-methyl-4a-azoniaanthracene bromide

A mixture of 3-[1,3-azonia-2-(1,3-dioxolan-2-yl)benzyl]-5-methylcatechol diacetate bromide and 48% hydrobromic acid was heated under reflux for about 1 hour. After cooling the dark reaction mixture, the desired product, 5,6-dihydroxy-8-methyl-4a-azoniaanthracene bromide, was collected by filtration.

The product was dissolved in water and treated with fluoroboric acid. The 5,6-dihydroxy-8-methyl-4a-azoniaanthracene fluoroborate was recrystallized from hot water as red needles. M.P. (dec.) 241° C.

*Analysis.*—Calcd. for $C_{14}H_{12}BF_4NO_2$: C, 53.7; H, 3.8; N, 4.5. Found: C, 54.3; H, 3.9; N, 5.0.

EXAMPLE 10

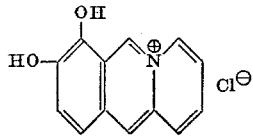

5,6-dihydroxy-4a-azoniaanthracene chloride

A mixture of 3-[1,3-azonia-2-(1,3-dioxolan-2-yl)benzyl]-catechol diacetate bromide and concentrated hydrochloric acid was heated under reflux for 2 hours. The mixture was allowed to stand at 5° C. for 12 hours and 5,6 - dihydroxy - 4a - azoniaanthracene chloride was recovered in 95% yield.

EXAMPLE 11

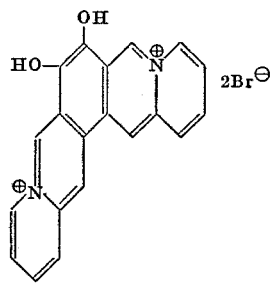

6,7-dihydroxy-4a,8a-diazoniapentaphene dibromide

A mixture of 36.4 g. of 3,6-bis[1-azonia-2-(1,3-dioxolan-2-yl)benzyl]catechol diacetate dibromide and 200 ml. of 30% hydrogen bromide in acetic acid was heated under reflux for 45 minutes. Deep red crystals separated from solution during this period. After cooling, the mixture was diluted with 400 ml. of ether and the product was collected by filtration. 6,7-dihydroxy-4a,8a-diazoniapentaphene dibromide (21.2 g., 84%) was obtained as dark purple needles (hemihydrate) after recrystallization from boiling water containing 2 ml. of 48% hydrobromic acid. The product had a melting point in excess of 300° C.

*Analysis.*—Calcd. for $C_{20}H_{15}Br_2N_2O_{5/2}$: C, 49.6; H, 3.1. Found: C, 49.6; H, 3.1.

EXAMPLE 12

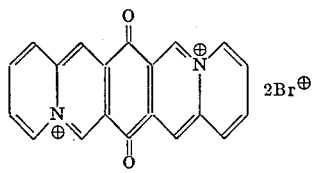

4a,11a-diazoniapentacene-6,13-dione dibromide

A mixture of 2,5-bis[1,3-dioxolan-2-yl)benzyl]hydroquinone diacetate dibromide and 48% aqueous hydrogen bromide was heated under reflux for 12 hours. The yellow crystals which separated from the mixture were collected and recrystallized from boiling water containing a trace of hydrogen bromide. The lustrous yellowish-brown plates of 4a,11a-diazoniapentacene-6,13-dione dibromide were dried at 140° C. over $P_2O_5$ to yield the product as a monohydrate.

Analysis.—Calcd. for $C_{20}H_{14}Br_2N_2O_3$: C, 49.0; H, 2.9. Found: C, 49.0; H, 2.9.

EXAMPLE 13

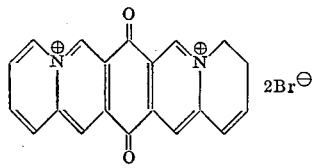

4a,7a-diazoniapentacene-6,13-dione dibromide 2,6 - bis[1,3 - dioxolan - 2 - yl)benzyl]hydroquinone diacetate dibromide was treated with aqueous hydrogen bromide according to the method of Example 12. The lustrous yellowish-brown plates were dried over $P_2O_5$ to yield 4a,7a - diazoniapentacene - 6,13 - dione dibromide.

Analysis.—Calcd. for $C_{20}H_{12}Br_2N_2O_2$: C, 50.9; H, 2.5; Br, 34.0. Found: C, 50.6; H, 2.3; Br, 33.8.

The dihydroxy azonia salts of our invention can be oxidized to yield the corresponding novel dione salts or they can be esterified to yield the corresponding novel diester salts.

The azonia dione salts of our invention prepared by the oxidation of azonia diol salts have the formula:

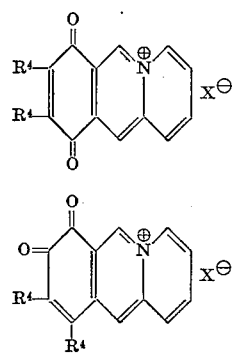

or

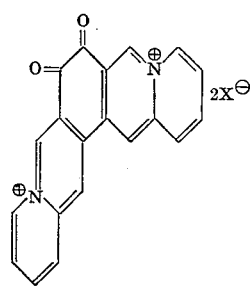

and the azonia diester salts prepared by the esterification of the azonia diol salts have the formula:

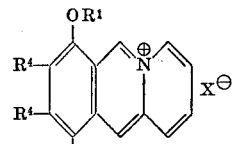

or

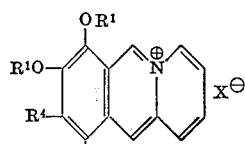

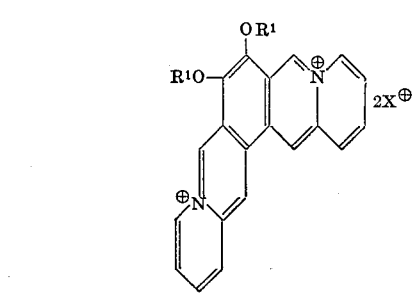

wherein $R^1$, $R^4$ and $X^\ominus$ are as hereinbefore defined.

The oxidation of the azonia diol salt can be carried out with oxidizing agents such as ferric chloride, cupric chloride, nitric acid, benzoquinone, etc. Nitric acid and benzoquinone are among the preferred oxidizing agents. The oxidation can be carried out by mixing the azonia diol salt with the oxidizing agent, e.g., in an inert solvent.

Examples of novel azonia diones produced by oxidizing azonia diols include salts having cations as 4a-azoniaanthracene-5,6-dione; 4a-azoniaanthracene-5,8-dione; 8-methyl-4a-azoniaanthracene-5,6-dione; 8 - phenyl - 4a-azoniaanthracene-5,6-dione; 4a,8a - diazoniapentaphene - 6,7-dione; etc.

The novel diester derivatives of the azonia salts of our invention can be prepared by esterifying the corresponding azonia diol salt by conventional esterification procedures, e.g., by contacting an azonia diol salt with a lower alkanoic acid anhydride in the presence of an esterification catalyst, e.g., sulfuric acid.

Examples of the azonia diester salts thus produced include salts having cations such as 5,6-diacetoxy-4a-azoniaanthracene; 5,8-dipropionyloxy-4a-azoniaanthracene; 5,6-dibutyryloxy - 8 - methyl - 4a - azoniaanthracene; 5,6 - diacetoxy-8-phenyl-4a-azoniaanthracene; 6,7-diisobutyryloxy-4a,8a-diazoniapentaphene; etc.

The following examples illustrate novel azonia dione and azonia diester salts of our invention and their preparation.

EXAMPLE 14

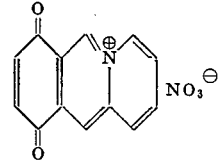

4a-azoniaanthracene-5,8-dione nitrate

A mixture of 14 g. of 5,8-dihydroxy-4a-azoniaanthracene bromide was allowed to react with nitric acid at autogenous temperature. The reaction mixture was diluted with 50 ml. of ethanol and the crude product was recovered by filtration. The crude product was washed with ethanol and ether to give 11.3 g. (87% yield) of 4a-azonia-5,8-dione nitrate.

EXAMPLE 15

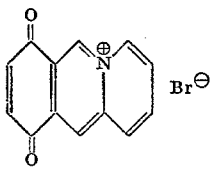

4a-azoniaanthracene-5,8-dione bromide

A mixture of 5,8-dihydroxy-4a-azonianthracene bromide, methanol and benzoquinone was heated under reflux to yield 4a-azoniaanthracene-5,8-dione bromide.

EXAMPLE 16

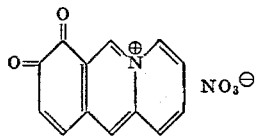

4a-azoniaanthracene-5,6-dione nitrate 4a-azoniaanthracene-5,6-dione nitrate was prepared by oxidizing 5,6-dihydroxy-4a-azoniaanthracene bromide with nitric acid according to the method of Example 14.

EXAMPLE 17

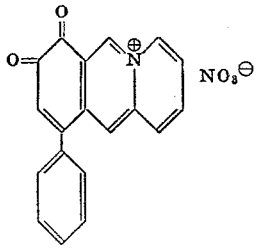

8-phenyl-4a-azoniaanthracene-5,6-dione nitrate 8-phenyl-4a-azoniaanthracene-5,6-dione nitrate was prepared by oxidizing a 5,6-dihydroxy-8-phenyl-4a-azoniaanthracene bromide with nitric acid according to the method of Example 14.

EXAMPLE 18

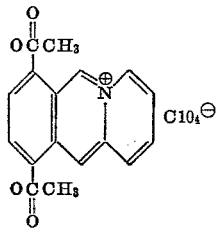

5,8-diacetoxy-4a-azoniaanthracene perchlorate

A sample of 5,8-dihydroxy-4a-azoniaanthracene bromide was acetylated with acetic anhydride-sulfuric acid. An aqueous solution of the crude material thus obtained was treated with a sodium perchlorate solution to yield a crude sample of product. Recrystallization from acetic acid and acetonitrile-ether gave pure material.

*Analysis.*—Calcd. for $C_{17}H_{14}ClNO_8$: C, 51.5; H, 3.5; Cl, 9.0; N, 3.5. Found: C, 51.1; H, 3.7; Cl, 9.2; N, 3.6.

EXAMPLE 19

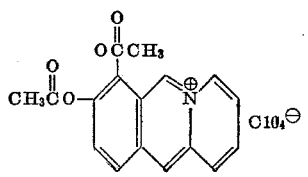

5,6-diacetoxy-4a-azoniaanthracene perchlorate

Acetylation of 5,6-dihydroxy-4a-azoniaanthracene bromide and treatment of the product with sodium perchlorate as described in Example 18, gave, after recrystallization from acetone-ether, an analytical sample of 5,6-diacetoxy-4a-azoniaanthracene perchlorate, M.P., 251° (dec.).

*Analysis.*—Calcd. for $C_{17}H_{14}ClNO_8$: C, 51.6; H, 3.5; Cl, 9.0; N, 3.5. Found: C, 52.2; H, 3.6; Cl, 8.7; N, 4.2.

EXAMPLE 20

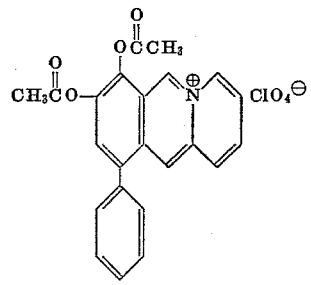

5,6-diacetoxy-8-phenyl-4a-azoniaanthracene perchlorate

Acetylation of 5,6 - dihydroxy - 8 - phenyl-4a-azoniaanthracene bromide and treatment of the product with sodium perchlorate as described in Example 18, gave, after recrystallization from acetonitrile-ether, an analytical sample of 5,6- - diacetoxy - 8 - phenyl-4a-azoniaanthracene perchlorate, M.P., 206–208°.

*Analysis.*—Calcd. for $C_{23}H_{18}ClNO_8$: C, 58.6; H, 3.8; Cl, 7.5; N, 3.0. Found: C, 58.3; H, 3.7; Cl, 7.5; N, 2.6.

The anionic component of the novel salts of our invention represented by the symbol $X^\ominus$, can be varied by anion exchange and is not limited to those anions specifically disclosed herein before. The anion exchange can be accomplished by treating any of the novel salts with an acid or a salt yielding the desired anion. The treatment can be carried out in an aqueous solution.

Examples of the anion $X^\ominus$ include anions such as fluoride, chloride, bromide, iodide, sulfate, nitrate, perchlorate, fluoroborate, tetraphenylborite, methylsulfate, ethylsulfate, benzenesulfonate, toluene sulfonate, tartrate, succinate, acetate, citrate, phosphate, sulfonate, perchlorate, etc.

The following examples illustrate anion exchange reactions with certain salts of our invention and the novel salts resulting therefrom.

EXAMPLE 21

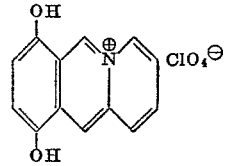

5,8-dihydroxy-4a-azoniaanthracene perchlorate

An aqueous solution of 5,8 - dihydroxy - 4a - azoniaanthracene bromide was mixed with an aqueous solution of sodium perchlorate to yield 5,8 - dihydroxy-4a-azoniaanthracene perchlorate.

EXAMPLE 22

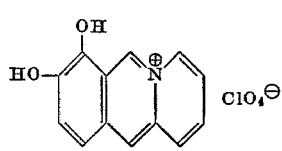

5,6-dihydroxy-4a-azoniaanthracene perchlorate

An aqueous solution of 5,6 - dihydroxy - 4a-azoniaanthracene bromide was treated with an aqueous solution of sodium perchlorate according to the method of Example 21 to yield 5,6 dihydroxy - 4a-azoniaanthracene perchlorate.

EXAMPLE 23

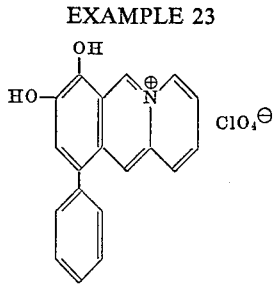

5,6 - dihydroxy - 8 - phenyl-4a-azoniaanthracene perchlorate was prepared from the aqueous solution of the corresponding bromide by treatment with an aqueous solution of sodium perchlorate in accordance with the method of Example 21.

EXAMPLE 24

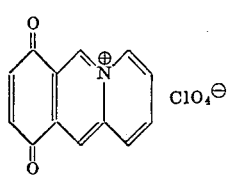

4a-azoniaanthracene-5,8-dione perchlorate

An aqueous solution of 4a-azoniaanthracene-5,8-dione nitrate prepared by the method of Example 14 was treated with sodium perchlorate to yield the monohydrate of 4a-azoniaanthracene-5,8-dione perchlorate.

*Analysis.*—Calcd. for $C_{13}H_{10}ClNO_7$: C, 47.6; H, 3.0; N, 4.3. Found: C, 47.5; H, 2.4; N, 4.3.

EXAMPLE 25

An aqueous solution of the 4a-azoniaanthracene-5,8-dione bromide of Example 15 was treated with sodium perchlorate to yield the monohydrate of 4a-azoniaanthracene-5,8-dione perchlorate.

The infrared spectrum of the product was identical with that of the product of Example 24.

EXAMPLE 26

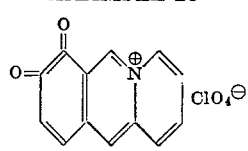

4a-azoniaanthracene-5,6-dione perchlorate

An aqueous solution of 4a-azoniaanthracene-5,6-dione nitrate was treated with sodium perchlorate according to the method of Example 24 to yield 4a-azoniaanthracene-5,6-dione perchlorate.

*Analysis.*—Calcd. for $C_{13}H_8ClNO_6$: C, 50.4; H, 2.6; Cl, 11.5; N, 4.5. Found: C, 50.9; H, 3.1; Cl, 11.8; N, 4.6.

EXAMPLE 27

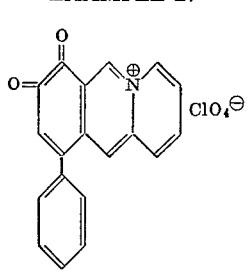

8-phenyl-4a-azoniaanthracene-5,6-dione perchlorate

8 - phenyl - 4a - azoniaanthracene-5,6-dione perchlorate was obtained by treating an aqueous solution of the nitrate with sodium perchlorate according to the method of Example 24.

*Analysis.*—Calcd. for $C_{19}H_{12}ClNO_6$: C, 59.1; H, 3.1; N, 3.6; Cl, 9.2. Found: C, 59.4; H, 2.9; N, 3.8; Cl, 9.1.

EXAMPLE 28

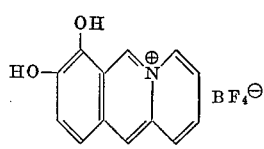

5,6-dihydroxy-4a-azoniaanthracene fluoroborate

A mixture of 5,6 - dihydroxy - 4a - azoniaanthracene chloride in water was treated with fluoroboric acid to yield 5,6 - dihydroxy - 4a - azoniaanthracene fluoroborate which crystallized from the solution.

EXAMPLE 29

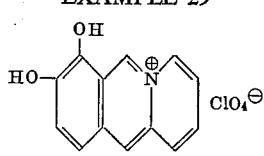

5,6-dihydroxy-4a-azoniaanithracene perchlorate

A mixture of 5,6 - dihydroxy - 4a - azoniaanthracene bromide in water was treated with perchloric acid to yield 5,6-dihydroxy-4a-azoniaanthracene perchlorate.

The anion interchange process illustrated hereinbefore can be applied to any of the novel compounds of our invention, i.e., the novel [1 - azonia - 2 - (1,3-dioxolan-2-yl)benzyl]aromatic diester salts as well as the azoniaanthracene; diazoniapentaphene and diazoniapentacene salts.

The cations of the azonia diol and azonia diester salts of our invention can be represented by the formulae:

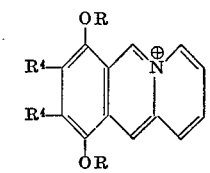

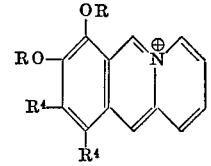

and

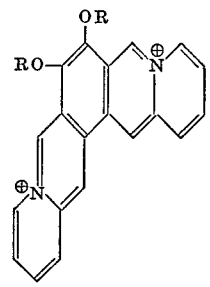

wherein R is hydrogen or lower acyl and $R^4$ is as hereinbefore defined.

The novel compounds of our invention are useful in photographic processing. Thus, the azonia diol salts and the azonia diester salts are developers for exposed silver halide photographic film and the azonia dione salts are silver bleaches, useful in reversal photographic processing.

The developers of our invention can be used by immersing exposed photographic film in an aqueous alkaline solution of the azonia diol or azonia diester salt and the silver bleaches can be used by immersing developed photographic film in an aqueous acid solution of the azonia dione salt.

When used as photographic developers or bleaches, the anion X⊖ of the salts of our invention must be a photographically acceptable anion, i.e., an anion which has little or no deleterious action on the photographic element being processed.

The azonia diol, diester and dione salts of our invention are also useful as "indicators" of the acidity or basicity of the solutions in which they are dissolved because they change color reversibly with a change in pH. When used as indicators the anion X⊖ must not be one which renders the salt insoluble in the solvent, e.g., water, in which it is employed.

The invention has been described in considerable detail with particular reference to certain preferred embodiments thereof, but it will be understood that variations and modifications can be effected within the spirit and scope of the invention as described hereinabove and as defined in the appended claims.

The embodiments of the invention in which an exclusive property or privilege is claimed are defined as follows:

1. A salt having a cation selected from the group consisting of cations of the formula:

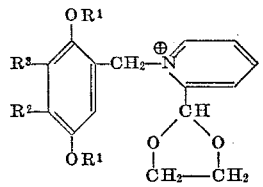

and cations of the formula:

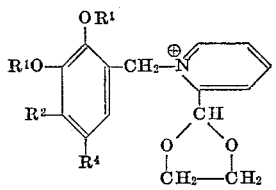

wherein $R^1$ is lower alkanoyl; $R^2$ and $R^3$ are selected from the group consisting of:

(a) hydrogen,
(b) lower alkyl,
(c) phenyl and
(d) 1-azonia-2-(1,3-dioxolan-2-yl)benzyl;

$R^4$ is selected from the group consisting of:

(a) hydrogen,
(b) lower alkyl and
(c) phenyl;

and one of the substituents $R^2$, $R^3$ and $R^4$ is hydrogen when one of the substituents $R^2$ and $R^3$ is 1-azonia-2-(1,3-dioxolan-2-yl)benzyl and the anion is selected from the group consisting of bromide, chloride, iodide, fluoride, nitrate, phosphate, perchlorate, sulfate, methylsulfate, ethylsulfate, benzenesulfonate, toluenesulfonate, fluoroborate, tetraphenylborite, acetate, citrate, succinate and tartrate.

2. A salt having a cation of the formula:

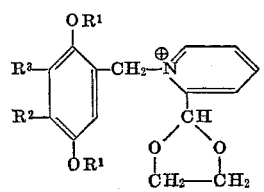

wherein $R^1$ is lower alkanoyl; $R^2$ and $R^3$ are selected from the group consisting of:

(a) hydrogen;
(b) lower alkyl;
(c) phenyl and
(d) 1-azonia-2-(1,3-dioxolan-2-yl)benzyl;

and one of the substituents $R^2$ and $R^3$ is hydrogen when the other is 1-azonia-2-(1,3-dioxolan-2-yl)benzyl and the anion is selected from the group consisting of bromide, chloride, iodide, fluoride, nitrate, phosphate, perchlorate, sulfate, methylsulfate, ethylsulfate, benzenesulfonate, toluenesulfonate, fluoroborate, tetraphenylborite, acetate, citrate, succinate and tartrate.

3. A salt having a cation of the formula:

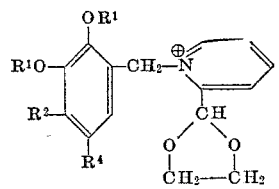

wherein $R^1$ is lower alkanoyl; $R^2$ is selected from the group consisting of:

(a) hydrogen;
(b) lower alkyl;
(c) phenyl;
(d) 1-azonia-2-(1,3-dioxolan-2-yl)benzyl;

$R^4$ is selected from the group consisting of:

(a) hydrogen;
(b) lower alkyl and
(c) phenyl;

and $R^4$ is hydrogen when $R^2$ is 1-azonia-2-(1,3-dioxolan-2-yl)benzyl and the anion is selected from the group consisting of bromide, chloride, iodide, fluoride, nitrate, phosphate, perchlorate, sulfate, benzene sulfonate, toluenesulfonate, methylsulfate, ethylsulfate, fluoroborate, tetraphenylborite, acetate, citrate, succinate and tartrate.

4. 3-[1-azonia-2-(1,3-dioxolan-2-yl)benzyl] - 5-phenyl catechol diacetate bromide.

5. 3-[1-azonia-2 - (1,3-dioxolan - 2-yl)benzyl]catechol diacetate bromide.

6. 3,6-bis[1-azonia-2 - (1,3 - dioxolan - 2-yl)benzyl]-catechol diacetate dibromide.

7. 2-[1-azonia-2-(1,3-dioxolan-2 - yl)benzyl] - hydroquinone diacetate dibromide.

8. 3-[1-azonia-2-(1,3-dioxolan - 2-yl)benzyl] - hydroquinone diacetate dibromide.

References Cited

Harris et al., J. Am. Chem. Soc., vol. 73, pp. 3959–63 (1951).

Bradsher et al., J. Am. Chem. Soc., vol. 77, pp. 453–55 (1955).

Bradsher et al., J. Am. Chem. Soc., vol. 80, pp. 933–4 (1958).

HENRY J. JILES, Primary Examiner

A. L. ROTMAN, Assistant Examiner

U.S. Cl. X.R.

96—56.5; 260—289, 294.8, 297, 475